(12) United States Patent
Haussmann et al.

(10) Patent No.: US 8,281,640 B2
(45) Date of Patent: Oct. 9, 2012

(54) CHECK WEIGHT, METHOD AND SYSTEM TO ENSURE TRACEABILITY OF SAME

(75) Inventors: Holger Haussmann, Jona (DE); Roland Nater, Winterthur (CH); Patrick Von Arx, Winterthur (CH); Hans Joerg Burkhard, Wolfhausen (CH); Michael Greuter, Dietlikon (CH)

(73) Assignee: Mettler-Toledo AG, Greifensee (CH)

( * ) Notice: Subject to any disclaimer, the term of this patent is extended or adjusted under 35 U.S.C. 154(b) by 225 days.

(21) Appl. No.: 12/648,815

(22) Filed: Dec. 29, 2009

(65) Prior Publication Data

US 2010/0147049 A1   Jun. 17, 2010

Related U.S. Application Data

(63) Continuation of application No. PCT/EP2008/058650, filed on Jul. 4, 2008.

(30) Foreign Application Priority Data

Jul. 6, 2007   (EP) ..................................... 07111973

(51) Int. Cl.
  *G01G 19/56*   (2006.01)
(52) U.S. Cl. ......................................................... 73/1.13
(58) Field of Classification Search ..................... 73/1.13
  See application file for complete search history.

(56) References Cited

U.S. PATENT DOCUMENTS

| | | | | |
|---|---|---|---|---|
| 5,050,693 A | * | 9/1991 | Wirth et al. | 177/200 |
| 5,259,235 A | * | 11/1993 | Kolb | 73/1.65 |
| 6,583,370 B2 | | 6/2003 | Stoneberg | |
| 2003/0100406 A1 | * | 5/2003 | Millington et al. | 482/1 |

FOREIGN PATENT DOCUMENTS

| | | |
|---|---|---|
| DE | 326360 C | 9/1920 |
| DE | 4006375 A1 | 9/1991 |
| EP | 1585000 B1 | 9/2008 |
| WO | 2006/056830 A1 | 6/2006 |

* cited by examiner

*Primary Examiner* — Peter MacChiarolo
*Assistant Examiner* — Alex Devito
(74) *Attorney, Agent, or Firm* — Standley Law Group LLP

(57) ABSTRACT

A check weight (1) that is used to check a gravimetric measuring instrument, specifically a balance, or to check a further weight, is provided with a means of identification. This marking which is applied on the outside surface of the check weight includes a permanently affixed machine-readable identification code (2) which makes the specific weight piece individually recognizable. This opens the possibility for a method whereby an individually identifiable check weight can be traced back in time. A system for tracing check weights back in time includes one or more reader devices (6) that serve to record the marking, one or more processors (10) wherein the machine-readable identification code can be converted back into an identification code that can be electronically processed, and one or more data storage units, in particular a database (8) serving to store at least the data contained in the identification code.

16 Claims, 3 Drawing Sheets

CHECK WEIGHT, METHOD AND SYSTEM TO ENSURE TRACEABILITY OF SAME

CROSS-REFERENCE TO RELATED APPLICATIONS

This application is a continuation under 35 USC §120 of PCT/EP2008/058650, filed 4 Jul. 2008, which is in turn entitled to benefit of a right of priority under 35 USC §119 from European patent application 07 11 1973.9, which was filed 6 Jul. 2007. The content of each of the applications is incorporated by reference as if fully recited herein.

TECHNICAL FIELD

The disclosed embodiments, which are in the field of metrology, relate to weights that are used to check balances and to check or measure other weights.

BACKGROUND OF THE ART

Highly sensitive balances in particular, such as microbalances and ultra-microbalances, analytical balances or precision balances, are subject to influence factors which can lead to measurement deviations over the course of time. Such balances therefore have to be checked on a regular basis in order to ensure that they produce accurate weighing results. Such checks, so-called routine tests which are performed within a regulatory framework, are officially required in particular for balances used in the fields of pharmacology, biotechnology and food technology and are set down in FDA regulations (Food and Drug Administration, U.S. Department of Health and Human Services). However, the manufacturers of balances also recommend to their customers that balances used in commercial applications be checked at regular intervals.

To determine deviations one uses check weights with defined nominal values. According to norm standards, for example the internationally recognized recommendation R111 published by OIML (Organisation Internationale de Métrologie Légale), these kinds of check weights are subject to tolerance limits within which the actual weight values have to lie in relation to the nominal weight value. Under this tolerance system, the weights are divided into different weight classes according to different precision requirements. For example, the tolerance limit for a one-milligram weight in class E1 (the highest accuracy class) is ±0.003 mg, while the tolerance limit in class M1 (the lowest accuracy class applicable to a one-milligram weight) is ±0.2 mg.

Check weights, as the term is used in the present context, should be understood to include weights of all kinds that are used to check and/or calibrate and/or certify balances or weights particularly in areas that are subject to regulatory control. These check weights are occasionally also called verification weights or calibration weights.

Check weights can be made of one solid piece or of several pieces of material. Single-piece check weights are made of one block of material, while check weights composed of more pieces have a cavity on the inside which is filled with so-called adjustment material up to the point where the nominal weight has been attained, whereupon the cavity is closed off. It should be noted, however, that check weights made up of a plurality of pieces are not permitted in the highest accuracy classes according to OIML.

As the actual weight values of check weights will change over time due to wear, this could have the consequence—in cases where these check weights are used to check balances—that weighing results or industrial processes may also run outside their tolerance limits. One must therefore make certain that in any given case the check weight tolerance is being met. To accomplish this purpose, the check weights themselves are regularly checked against other check weights, so-called verification standards. The time intervals for such verification checks are dependent on the respective accuracy class of the weights or on the area of application and the particular circumstances of the application.

For each individual check weight, a certificate is issued on request, which states the actual weight value at the specific time, the nominal weight value, the accuracy class relative to a given class limit, as well as a calibration I.D. number and the number of the calibration certificate. Each time another verification check, a so-called recalibration, is performed at a later date, a new certificate is issued in which a new certificate number is assigned to the same weight, but the same calibration I.D. number remains assigned to the weight.

The check weights or sets of check weights with different weight values are stored in special weight container cases for the distribution and later, at their place of application, for storage by the user. In such a container case, there are appropriately dimensioned seating recesses provided for each weight denomination, so that for example a 100-gram weight can be set with a precise fit only into the recess for 100-gram weights, but not into a recess for a 50-gram weight, while it would not completely fill out the recess for a 200-gram weight, so that a correlation between weights and recesses is possible based on size. The certificates of the individual weight pieces are placed into these container cases so that in principle the connection between certificate and check weight is established. This is normally made evident by means of a label that is affixed to the container case, on which the calibration I.D. number is printed, and a further label on which the certificate number is printed.

Due to the manual handling of the check weights in the process of performing the aforementioned routine tests, it is however easily possible that the connection between the weight piece and its associated certificate and/or its calibration I.D. number gets lost. This can happen for example if a balance is to be certified or calibrated for 400 grams and if for this purpose—because there is no 400-gram weight available—a 200-gram weight piece and two 100-gram weight pieces are used instead. Regardless of whether the two 100-gram weight pieces are stored in the same container case or come from two different container cases, it is possible that handling errors will occur in the process, resulting in a mix-up of the two 100-gram pieces. The consequence of this is a wrong match between certificate and weight piece, which cannot even be effectively checked, so that an error of this kind remains undiscovered.

This method has the problem that there is no definite correlation that ties the certificate to the check weight, i.e. to the physical weight piece itself. The handling of such check weights therefore requires the utmost diligence in order to ensure that the correct match between certificate and calibrated weight piece is permanently preserved. Still, there is no guarantee of achieving this goal. Inadvertent mix-ups cannot be ruled out, nor can they be reliably detected after the fact.

In German laid-open application DE 40 06 375 A1, the concept of equipping check weights with a code marking that represents the weight value is disclosed. This is realized by electronically storing the weight value in an electronic circuit which is contained in the weight piece itself. This has the disadvantage that electrical contacts are necessary for the transmission of the data from the weight piece to the balance and vice versa and that because of these contacts, the weight has to be set in a defined position and, in particular, special devices are required which make the manufacture and use an error-prone process. Also, an electronic data storage is not totally error-resistant, so that data errors due to inappropriate handling of the check weights or also due to material fatigue, and thus calibration errors which occur as a result, cannot be completely ruled out in this case either. Furthermore, check weights of this kind are expensive to produce.

Since the identification marking only contains the initial actual value, this coding system does not provide an individual identification of each weight piece, but only a classification according to weight value. Under the method described in this reference, an individual weight piece can be traced back only insofar as the highest possible number of weight checks that can be performed is entered in the electronic data storage device of the weight and each weight check is counted until this upper limit is reached. Traceability beyond this time frame or in regard to other attributes such as place and date of manufacture, production lot number, etc., is impossible. A recall campaign which could be necessary for example in case of a manufacturing error in a production lot is therefore not possible for check weights that are identified in this way.

It is therefore an objective to advance the design of a check weight in such a way that the weight is permanently and individually traceable.

SUMMARY

This objective is met through the concept that the check weight itself carries an identification, specifically a marking by way of a machine-readable identification code on the outside of the weight, whereby each weight piece is made individually recognizable.

This concept has the advantage that the check weights can be permanently and reliably matched to their certificates and that all data can be read and processed by a machine and also be centrally stored if required. Mix-ups in the handling of the weights can thus to a large extent be either avoided or reliably detected after they have occurred. Furthermore, for example if check weights that have been graded as OIML Class E weights are found to be out of tolerance, such weights can be reassigned to a lower accuracy class without any problem.

Such a system of identification is advantageous for check weights of monolithic construction as well as those assembled from more than one piece. Check weights are made of a metal or a metal alloy of an invariant material density that is prescribed by the applicable norm standards.

Placing the identification code on the outside of the weight piece has the advantage that the processes of affixing the code and of reading it can be realized in a simple manner.

In advantageous embodiments it is intended to implement the identification code in a binary form of representation, in particular as a data matrix code or as a miniaturized barcode.

In preferred embodiments, the identification code includes a weight number that is uniquely assigned to the weight piece.

In practical further developed embodiments, the identification code contains further data about the respective weight piece, including for example the production lot number and specific dates, in particular the production date, the date when the marking was applied and/or the date of the original calibration. This has the advantage that during weight checking processes the data of the check weight can also be obtained without accessing external databases or data backup on in-house storage media and such processes are therefore simplified and expedited.

A further objective is to provide a method through which check weights of the foregoing description can be traced back in time. This is achieved by:

1) establishing an identification code,
2) converting the identification code into a machine-readable code format, and
3) placing the code in the machine-readable format as a marking or a distinguishing means on the weight piece.

The identification code contains essentially a weight number that is uniquely assigned to the check weight. However, it is also conceivable to set up the identification code in any other way that may be desired. The only essential requirement is that the identification code thus established has to be suitable for conversion into the intended machine-readable code that is to be put as a marking on the weight piece. This process can be carried out immediately following the production of the check weights or also at a later point in time. Including the marking within the scope of the production process has the advantage that every single weight piece is identifiable and thus traceable already at the completion of the production process. Applying the marking at a later time on the other hand has the advantage that check weights that are already in use, in particular if the correlation with their respective certificate has been lost, can afterwards be given an identification which makes them traceable again.

It is intended to implement the code conversion in practice by converting the identification code into a matrix code or a miniature barcode.

In an advantageous implementation of the marking method using a binary form of representation, the marking process is performed with a laser. This has the advantage that the marking process can be performed without loss of material or at worst an only minimal loss and that the mark is at the same time connected in a permanent way to the weight piece. Known laser marking processes can produce an identification code pattern by means of a matte finish or through the method of the so-called annealing colors.

Other inscribing methods that are well suited for the application of a marking include for example pin marking, etching, or electron beam scribing. But further methods, other than those mentioned here, are likewise conceivable.

According to an advantageous further development of the method, after the marking has been applied to the check weight, the respective identification code is permanently stored in a database. This creates the advantageous possibility to systematically process and administrate the registered identification codes and the data of the weight pieces marked with them. It is advantageous to also register and store the certificate data in the database together with the identification code. Thus, the certificate data for individual single check weights can automatically be kept available and sent out on request in a simple and reliable manner.

When a certificate is made out for a control weight, it contains a unique reference to the identification code. Particularly if the identification code includes a weight number that is uniquely assigned to the weight, the weight number is also stated on the certificate.

As a checking-, calibrating- or recalibrating procedure can also include a comparison of a further check weight against a first check weight, in particular against a verification standard, it is advantageous if the identification code of the first check weight, specifically of the verification standard, is likewise recorded in the database, and it may also be stated on the certificate. In this way, a high degree of traceability can be achieved.

The certificate data further include the calibration I.D. number, the certificate number, the issue date of the certificate, the shape and material of the check weight, the identity of the person performing the weight check, the conditions under which the weighing took place, the environmental conditions such as temperature and barometric pressure, the current weight value, as well as statistical data concerning the weight check.

As the weight pieces are recalibrated from time to time, it is a preferred practice to establish a history file for the specific weight based on the chronological sequence of certificate data. With the history file, measured and/or stored data can be compared to those of a preceding certificate, the results can be processed further and, if desired, the results can be used to predict the extent to which the weights remain usable in the future.

When a routine test is performed, i.e. to check a balance by means of a check weight, a program can be executed in the processor of the balance whereby the identity of the check weight is investigated and validated before the weighing test is started.

A further objective is to provide a system whereby check weights can be traced individually on a permanent basis. The described embodiments have the advantage that all of the individually marked weight pieces can be systematically administrated and kept in particular under a centralized control, and that all of the data belonging to a given individual weight piece can be accessed at any time. The one or more processors can convert the marking code back into the underlying identification code and directly make use of the latter. The at least one memory unit serves to save the identification code and, advantageously, also further registered data (including for example the certificate data) belonging to the respective weight piece in a permanent and retrievable kind of storage. Such data are ideally kept available in a database which provides a centralized access and rapid systematic processing capability. With this, the basis of the traceability of a given weight is established, which over the life of the check weight will for example allow a retroactive assessment of past wear and thereby also allow extrapolations for the future. This can for example include a recommendation to change the recalibration interval or also to assign a weight to a lower class if it has been found to exceed its applicable tolerance. Thus the highest possible quality in the surveillance of check weights is assured, which increases the reliability of the balances and/or weights that are verified with these check weights.

According to a further advantageous embodiment of the system, the at least one processor is equipped with the capability to send out reports based on the results and/or extrapolations generated, such as for example a notice regarding the expiration of a verification time interval. This has the advantage that the surveillance of the check weights and the measurements performed with them can be systematically and reliably controlled from a central place, for example by the manufacturer of the weights. Thus there is assurance that the user of the check weights are alerted directly and reliably about any actions that need to be taken, which increases the quality of the respective measurement systems.

BRIEF DESCRIPTION OF THE DRAWINGS

In the following, the disclosed embodiments are explained in more detail with references to the drawings, wherein.

DETAILED DESCRIPTION OF THE DRAWINGS

Figure 1:
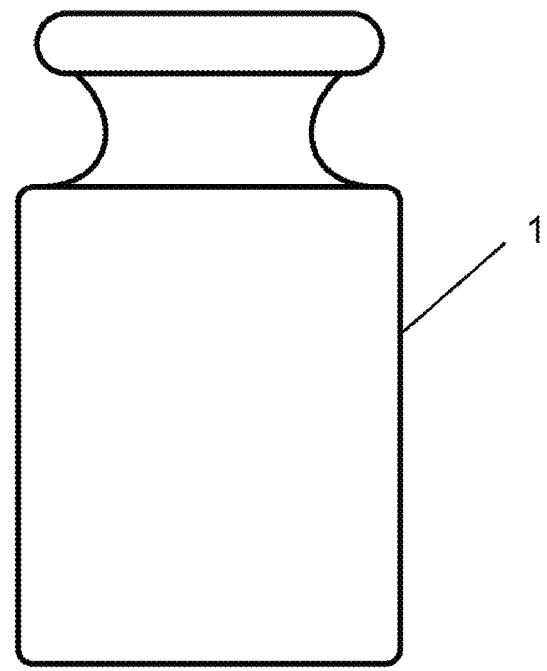
FIG. 1 depicts an example of a check weight in side view.

FIG. 1 shows an example of a check weight 1. Of course, the proportions of such check weights 1 can vary, or the weights 1 can have a completely different shape depending in particular on the nominal weight value. For example the weights with the smallest nominal values are normally configured as so-called wire weights or sheet metal weights.

Figure 2:
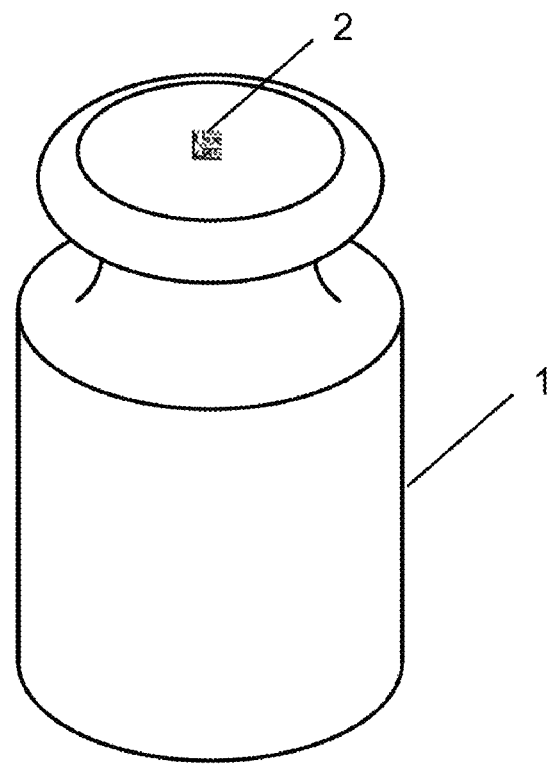
FIG. 2 depicts a top view of the FIG. 1 check weight, wherein the machine-readable identification code in the form of a marking is indicated schematically.

FIG. 2 illustrates a check weight 1 of the same type as in FIG. 1, with a marking in the form of a matrix code 2 that contains an identification code. The shape and size of the matrix code 2 are not true to scale. Depending on the kind of marking being used, the shape and size of the marking can vary. However, in the case of the more accurate weight classes E and F, the maximum size is prescribed by the norm standard. The way in which the marking is arranged on the weight piece can likewise vary. Advantageously, the marking is placed on top in order to be easily readable. However, it is just as conceivable to put the marking at some other location such as laterally or on the underside.

Figure 3:
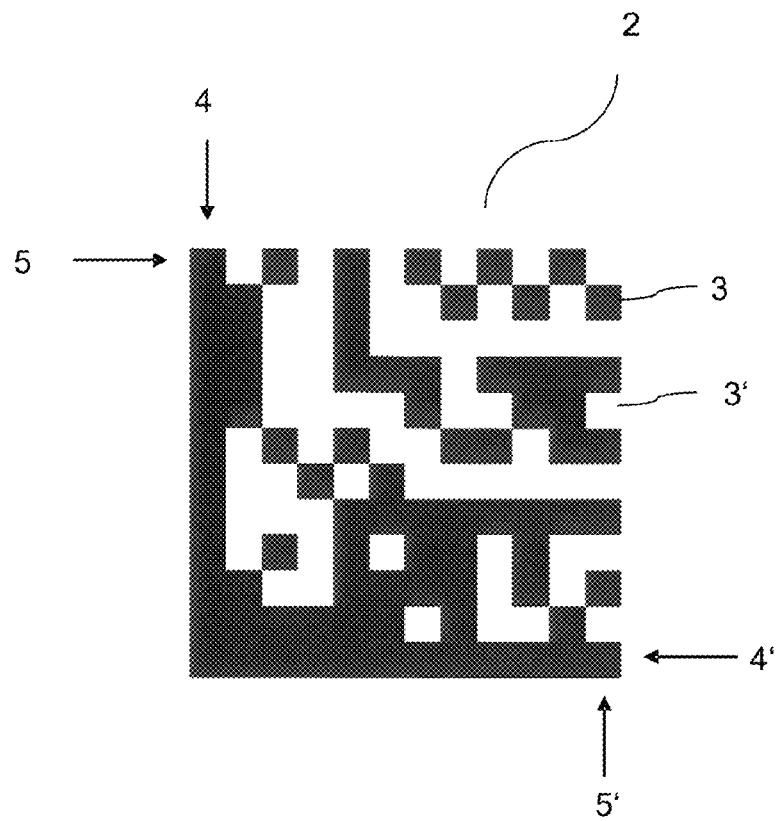
FIG. 3 shows a magnified image of a matrix-type marking that is put on a weight.

FIG. 3 shows an example for the design of such a marking 2 in the form of a matrix. As an example, the illustrated matrix 2 is a twelve-by-twelve array of matrix cells 3, 3', wherein the two binary values are represented in this case, respectively, by black matrix cells 3 and white matrix cells 3'. The border rows of cells 4 and 4' meeting at one corner of the matrix and the border rows 5 and 5' meeting at the opposite corner each form a pattern which allows the reader device to find the matrix code and to read and interpret it in the correct orientation. The border rows of cells with uniform binary values (black) running in the directions of the arrows 4, 4' represent the so-called finder pattern, while the two border rows of cells with alternating values running in the directions of the arrows 5, 5' along the respectively opposite borders of the matrix represent the so-called orientation pattern. The finder pattern 4, 4' is used to find the matrix code on the weight, while the orientation pattern 5, 5' along the respectively opposite borders serves for the correct orientation in the reading and evaluating of the code. The cells enclosed by the two border patterns 4, 4' and 5, 5' represent the actual identification code.

The representation of the binary light and dark bits can be realized in the manufacturing process for example by applying a matte finish to an originally polished surface for the matrix cells 3 shown in black in the drawing. Other techniques of producing binary representations can also be used. One example are indentations produced for example through the pin-marking process, or a color change achieved by surface annealing with a laser, or alternatively by etching.

Figure 4:
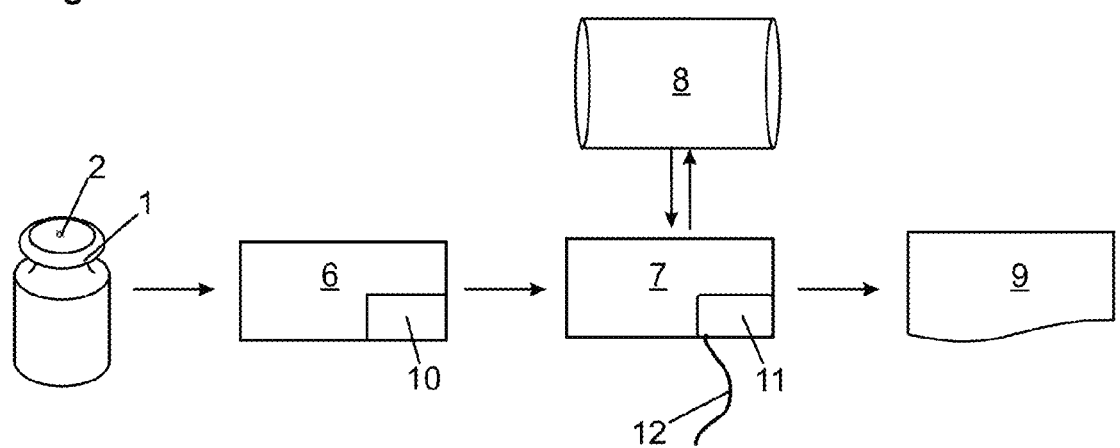
FIG. 4 schematically depicts a system for the traceability of a check weight.

FIG. 4 represents a schematic overview of a system to establish the traceability of a check weight 1 as described herein. The reader device 6 which is equipped with processor 10 reads the marking on the weight, in this case the matrix code 2. The processor 10 converts the matrix code into an identification code and transmits the latter to a computer 7 which is likewise equipped with one or more processors. The computer 7 is connected to a database 8 which contains all of the data needed to issue a certificate 9. Based on the identification code, the computer 7 is now enabled to retrieve the required data from the database 8 and to issue a certificate 9.

To ensure that every identification code is issued only once, the inscribing device (not shown here) which generates the marking, i.e. the matrix code 2, and which includes for example a laser, is equipped with appropriate software modules.

The database 8 has the capability to accept further data associated with the stored identification code, in particular data that are required for the certification, but also data that are generated only at later time, for example in connection with recalibrations of the check weight.

There can further be means which allow error checking of the matrix code 2 that has been read into the system.

By way of the data connection 12 which is only symbolically indicated, data can be transmitted from the processor 11 of the computer 7 to other processors and/or computers (not shown in the drawing) or received by the latter. These processors can be in direct connection with the processor 11, or they can also be part of an intranet or be accessible through the internet. Such computers can be installed for example at the customer's location or at other accredited metrological laboratories to which the certificate data can be transmitted. Through the data connection 12, the identification code acquired by the reader device 6 can be transmitted directly, i.e. without intermediate storage in the database 8, to a processor at a remote location (not illustrated). A further data connection, for example to a balance on which calibration checks are performed (not shown), allows data from this checking balance, for example weighing result data, to be transmitted to the processor 11 of the computer 7, or data from the computer 7, for example certificate data, to be transmitted to the checking balance. Further systems configurations are also conceivable.

Figure 5:
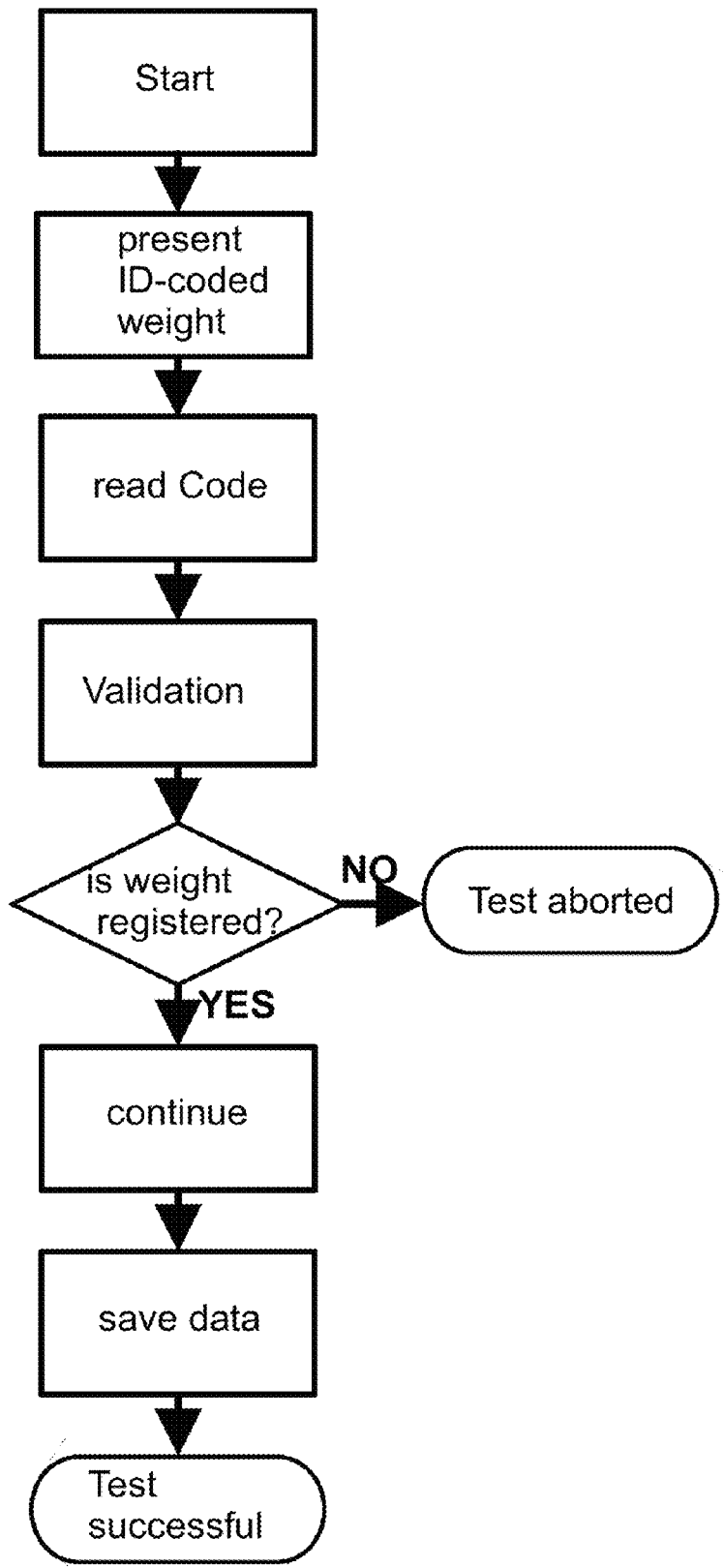
FIG. 5 is a flowchart diagram showing the time sequence of a routine test.

The flowchart diagram in FIG. 5 shows the time sequence of a routine test for the checking of a balance with a weight piece 1 that is marked as described herein. The machine-readable identification code on the weight piece 1, for example in the form of a matrix code 2 as shown in FIG. 2, is used here for the purpose of verification and validation. For example, it is possible to ascertain whether the specific weight piece 1 matches the weight piece described in the checking procedures, which could be internally generated or externally mandated procedures.

A program which is executed in the processor of the balance controls the process of the weighing check and instructs the user accordingly. As a first step following the start, the weight piece 1 is presented to a reader device 6 which reads the matrix code 2 and compares the corresponding identification code to the data which are stored in the computer 7 for the weighing check. The computer 7 can be a computer set up separately from the balance, or it can be incorporated in the balance where it can be constituted essentially by the processor of the balance. If the identification code matches the code data of a permissible, i.e. registered, weight piece 1, the weight-checking process is allowed to proceed and the routine test can be continued. If no match is found for the identification code, the weight-checking process is aborted and a failure message is issued. A record of the outcome can be produced by a printer that is connected to the balance and/or to the computer 7. It is also conceivable that a corresponding entry is made in the database 8 that is connected to the computer 7.

The drawing figures represent a schematic illustration of embodiments that are meant only as examples. Different kinds of markings are also conceivable as well as different arrangements of the markings on the individual weight pieces. It is also possible to include any other desired items of information in the code for the purpose of making the central traceability system more comprehensive.

What is claimed is:

1. A method for tracing an identifiable check weight back in time, comprising the steps of:
    establishing the identifiable check weight through the sub-steps of:
        providing a specific weight piece;
        forming an identification code whereby the specific weight piece is given an individual identity by which it can be recognized;
        converting the identification code into a machine-readable code format;
        affixing the converted code in the machine-readable format onto the specific weight piece as a marking;
        storing the identification code in a database; and
        generating a calibration certificate that associates the specific weight piece with the identification code;
    recalibrating the check weight having its identification code stored in the database;
    generating a new certificate for the recalibrated check weight, based upon the recalibrating step; and
    establishing, in the database, a history file for the recalibrated check weight, based on the chronological sequence of certificate data therefor in the database.

2. The method of claim 1, wherein:
    the converting step comprises converting the identification code into a matrix code or into a miniature barcode.

3. The method of claim 1, wherein:
    the affixing step comprises applying the machine-readable code format to the weight piece by means of a laser beam, pin marking, etching, or electron beam scribing.

4. The method of claim 1, further comprising the steps of:
    calibrating a further check weight against a first check weight having its identification code stored in the database;
    storing the identification code of the further check weight in the database, associating it with the identification code of the first check weight; and
    generating a certificate that associates the further check weight with the identification code of the first check weight.

5. The method of claim 1, further comprising the steps of:
    establishing a set of certificate data for each of a plurality of check weights;
    entering each certificate data set into the database; and
    correlating uniquely the identification code of each check weight to the corresponding certificate data set in the database.

6. The method of claim 5, wherein:
    the certificate data set comprises at least one of:
        a certificate number;
        a calibration identification number;
        an issue date of the certificate;
        a description of the shape and material of the check weight;
        an identity of a person performing the weight check;
        the conditions under which the weight check took place;
        the environmental conditions such as temperature and barometric pressure;
        the current weight value; and
        statistical data concerning the weight check.

7. The method of claim 1, comprising the further steps of:
    comparing, in at least one computer associated with the database, the data from the recalibrating step with data for at least one preceding certificate for the check weight; and processing results from the comparing step further in the at least one computer.

8. The method of claim 7, further comprising the step of:
predicting, in the computer, the amount of further use to be expected from the check weight, based on the processing results.

9. The method of claim 1, further comprising the step of:
transmitting, from the computer, at least one of: certificate data and a reminder notice regarding an approaching deadline for a calibration of the check weight.

10. The method of claim 1, further comprising the step of performing a routine test to check a balance, comprising the substeps of:
executing a program in a processor of the balance that verifies and validates the identity of the check weight; and
weighing the verified and validated check weight to check the balance.

11. A system for chronologically tracing an identifiable check weight back in time, comprising:
a check weight with an identification code that can be electronically processed, applied to the check weight in the form of a machine-readable marking; and
a processor, connected to a database that associates the identification code of the check weight with a first set of data associating the check weight with the identification code at a calibration weighing and with at least one second set of data associating the check weight with the identification code at a recalibration weighing, the processor adapted for connection to a balance on which the recalibration is performed.

12. The system of claim 11, comprising:
machine-readable programming, in the processor, to receive and process further data associated with the check weight, in addition to the identification code, the processed further data being recorded and stored in the database.

13. The system of claim 12, further comprising:
a communication device, operatively connected to the processor, for transmitting processed results of the machine-readable programming to other devices.

14. The system of claim 11, further comprising:
means, operatively connected to the processor, for generating a certificate associated with the check weight.

15. The system of claim 14, wherein:
the database stores data associated with the generated certificate, comprising at least one of:
a certificate number;
a calibration identification number;
an issue date of the certificate;
the shape and material of the check weight;
the identity of the person performing the weight check;
the conditions under which the weighing took place;
the ambient conditions such as temperature and barometric pressure;
the current weight value; and
statistical quantities concerning the weight check.

16. A method for tracing an identifiable check weight back in time, comprising the steps of:
providing the identifiable check weight, comprising a specific weight piece having a machine-readable code affixed thereto, the machine-readable code generated from an identification code that provides the specific weight piece an individual identity by which it can be recognized;
providing access to a database wherein are stored the identification code and a calibration certificate that associates the specific weight piece with the identification code;
recalibrating the check weight having its identification code stored in the database;
generating a new certificate for the recalibrated check weight, based upon the recalibrating step; and
establishing, in the database, a history file for the recalibrated check weight, based on the chronological sequence of certificate data therefor in the database.

* * * * *